T. L. NICKOLS.
Car Truck.
No. 30,833.  Patented Dec. 4, 1860.
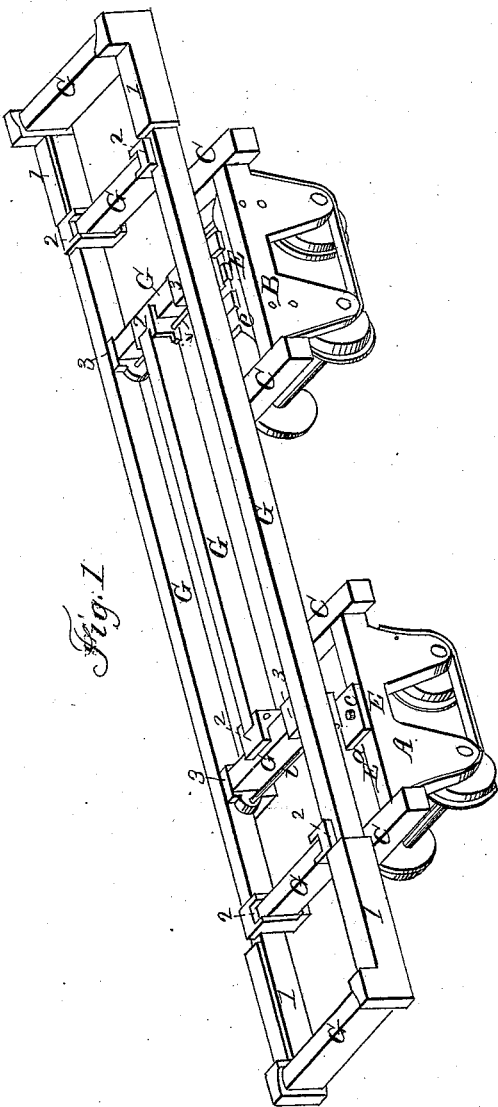
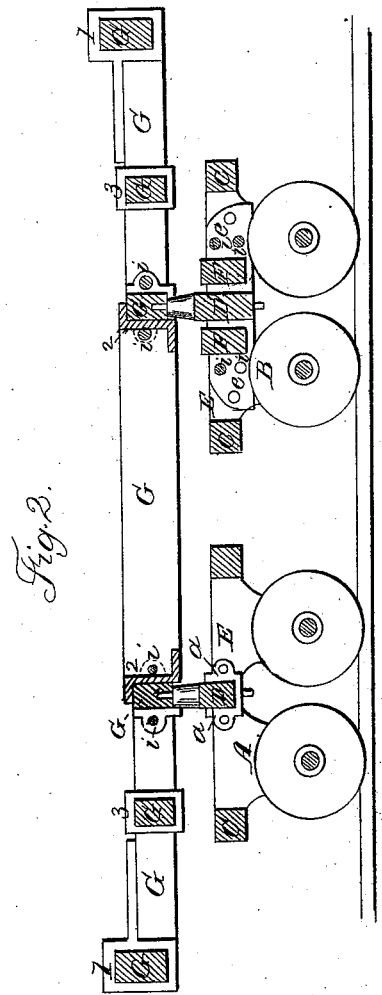
Witnesses:
E. Cohen
I. Hirsch
Inventor:
Thomas L. Nickols
By atty A B Stoughton

UNITED STATES PATENT OFFICE.

THOMAS L. NICKOLS, OF ALEXANDRIA, VIRGINIA.

CONSTRUCTING RAILROAD-CAR FRAMES AND TRUCKS WITH METALLIC JOINTS.

Specification of Letters Patent No. 30,833, dated December 4, 1860.

*To all whom it may concern:*

Be it known that I, THOMAS L. NICKOLS, of the city and county of Alexandria and State of Virginia, have invented certain new and useful Improvements in the Construction of Car-Truck and Car-Body Frames by Means of Metallic Joints; and I do hereby declare the following to be a full, clear, and exact description of the construction of the same, reference being had to the accompanying drawings, making a part of this specification, in which—

Figure 1 represents in perspective a pair of trucks and a car body frame constructed after my plan. Fig. 2 represents a longitudinal vertical section through the same.

Similar letters of reference where they occur in the separate figures denote like parts in both of the drawings.

It has been found that car, truck, and locomotive frames, by their jarring and shaking motion in passing over the road, as well as by collision or accident, invariably give-way at the joints. This is not remarkable inasmuch as the timber is always weakened at these points by cutting the tenons and mortises, and boring pin or bolt holes, into all of which water or moisture enters, and by repeated swelling and shrinking, split or wear out, or decay. I am aware that the upright posts of a freight car body have been supported upon metallic bearings. This is not so important as the sides of a car support no part of the load and are not subjected to strain and accident as the horizontal timbers are. I of course disclaim any such supports to the upright pieces, but confine myself exclusively to the framing or uniting of the horizontal pieces of the frame, and in this my invention consists.

To enable others skilled in the art to make and use my invention, I will proceed to describe the same with reference to the drawings.

A, B, represent a pair of trucks—the end pieces C of truck frames not having any particular strain upon them need not be united by the metallic joints. But the central piece D or bolster upon which the car or locomotive frame is supported rests at each end in metallic supports $a$, which have a flange $c$ resting on top of the side rails E, and a vertical groove and horizontal ledge, in and against which the piece D, is supported. These metallic supports are retained in their positions by light bolts, that require very little weakening of the side rails. The truck B, besides its central piece D, has two other cross pieces F, F, one on each side of D. These three pieces all rest and are supported and tied to the side rails by the metallic grooved and ledged plates $e$ $e$ the groove and ledge forming a gain or open mortise as it were.

G represents a car or locomotive frame, the longitudinal and cross pieces of which are of wood, but all united by metallic bearings such as are seen at 1, 2, 3, which show three different forms of bearings or joint connections. Of course other forms of joint pieces may be used, but they all possess general characteristics viz: horizontal flanges, and ledges, and vertical grooves or gains for receiving and supporting the timbers. Through bolts $i$ may be used to keep the frame from spreading either laterally or endwise—and so long as the frame cannot spread, any vertical strain upon its pieces is caught and rigidly held by the metallic bearings.

I am aware that "T" and "L" shaped plates of metal have been bolted over the joints of locomotive frames, but they do not support the superincumbent weight, besides these are designed to cure the mischief done in framing, and not to prevent framing altogether, as I do.

Having thus fully described my invention, what I claim as new, and desire to secure by Letters Patent, is—

Connecting the sills, bolsters, joists, and cross pieces of a locomotive car body, or truck frame, by metallic joints and bearings, to save the mortising and consequent weakening of said timbers, as herein described and represented—said bearings having as their general characteristics horizontal flanges on top to catch over the pieces with which they are to connect—horizontal ledges below to support the vertical strain, and vertical grooves or gains in their sides to prevent lateral movement, and for the purposes herein set forth.

THOMAS L. NICKOLS.

Witnesses:
    A. B. STOUGHTON,
    E. COHEN.